(12) United States Patent
Araki et al.

(10) Patent No.: US 11,702,988 B2
(45) Date of Patent: Jul. 18, 2023

(54) AMMONIA DECOMPOSITION FACILITY, GAS TURBINE PLANT EQUIPPED WITH SAME, AND AMMONIA DECOMPOSITION METHOD

(71) Applicant: Mitsubishi Power, Ltd., Yokohama (JP)

(72) Inventors: Hidefumi Araki, Yokohama (JP); Satoshi Tanimura, Yokohama (JP); Masakazu Nose, Yokohama (JP); Jun Sasahara, Yokohama (JP); Hideyuki Uechi, Tokyo (JP); Yukio Tanaka, Tokyo (JP); Atsushi Yuasa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 78 days.

(21) Appl. No.: 17/437,708

(22) PCT Filed: Mar. 13, 2020

(86) PCT No.: PCT/JP2020/011164
§ 371 (c)(1),
(2) Date: Sep. 9, 2021

(87) PCT Pub. No.: WO2020/189566
PCT Pub. Date: Sep. 24, 2020

(65) Prior Publication Data
US 2022/0154646 A1    May 19, 2022

(30) Foreign Application Priority Data
Mar. 15, 2019    (JP) .................. 2019-049013

(51) Int. Cl.
*F02C 7/22* (2006.01)
*F02C 3/22* (2006.01)
*F02C 6/18* (2006.01)

(52) U.S. Cl.
CPC .................. *F02C 7/22* (2013.01); *F02C 3/22* (2013.01); *F02C 6/18* (2013.01)

(58) Field of Classification Search
CPC ................. F02C 7/22; F02C 3/22; F02C 6/18
See application file for complete search history.

(56) References Cited

U.S. PATENT DOCUMENTS 11,156,168 B2 * 10/2021 Nose ..................... F02C 3/20
2017/0183996 A1 * 6/2017 Baker ................ B01D 53/1475
(Continued)

FOREIGN PATENT DOCUMENTS

| | | |
|---|---|---|
| GB | 1142941 | 2/1969 |
| GB | 1558659 | 1/1980 |

(Continued)

OTHER PUBLICATIONS

International Search Report dated May 26, 2020 in corresponding International Application No. PCT/JP2020/011164, with English translation.

(Continued)

*Primary Examiner* — Craig Kim
(74) *Attorney, Agent, or Firm* — Wenderoth, Lind & Ponack, L.L.P.

(57) ABSTRACT

An ammonia decomposition facility includes a heating medium line configured to flow a heating medium heated by heat generated by a gas turbine, an ammonia supply line configured to flow ammonia, an ammonia decomposition device, and an ammonia removal device. The ammonia decomposition device is configured to use heat of the heating medium from the heating medium line, thermally decompose ammonia from the ammonia supply line, and generate a decomposition gas containing hydrogen, nitrogen, and residual ammonia. The ammonia removal device is configured to remove the residual ammonia contained in the (Continued)

decomposition gas from the ammonia decomposition device.

11 Claims, 5 Drawing Sheets

(56) References Cited

U.S. PATENT DOCUMENTS

| | | | | |
|---|---|---|---|---|
| 2019/0084831 A1 | * | 3/2019 | Andersen | ........... F02C 3/22 |
| 2020/0032676 A1 | * | 1/2020 | Nose | ........... F02C 3/20 |
| 2022/0099021 A1 | * | 3/2022 | Uechi | ........... C01B 3/04 |
| 2022/0154646 A1 | * | 5/2022 | Araki | ........... F02C 7/22 |

FOREIGN PATENT DOCUMENTS

| | | | | | |
|---|---|---|---|---|---|
| GB | 1558659 A | * | 1/1980 | | ........... C01C 1/10 |
| JP | 53-102899 | | 9/1978 | | |
| JP | 64-56301 | | 3/1989 | | |
| JP | 4-342829 | | 11/1992 | | |
| JP | 2008-7378 | | 1/2008 | | |
| JP | 2009-7245 | | 1/2009 | | |
| JP | 2009-35458 | | 2/2009 | | |
| JP | 2009035458 A | * | 2/2009 | | |
| JP | 2012-255420 | | 12/2012 | | |
| JP | 2015-59075 | | 3/2015 | | |
| JP | 2018-76794 | | 5/2018 | | |
| JP | 2018-95512 | | 6/2018 | | |
| WO | WO-0046150 A1 | * | 8/2000 | | ........... C01B 3/025 |
| WO | 02/071451 | | 9/2002 | | |
| WO | WO-2007028208 A1 | * | 3/2007 | | ........... C10B 53/00 |
| WO | 2017/160154 | | 9/2017 | | |
| WO | WO-2017160154 A1 | * | 9/2017 | | ........... B01D 53/58 |

OTHER PUBLICATIONS

Written Opinion of the International Searching Authority dated May 26, 2020 in corresponding International Application No. PCT/JP2020/011164, with English translation.

* cited by examiner

AMMONIA DECOMPOSITION FACILITY, GAS TURBINE PLANT EQUIPPED WITH SAME, AND AMMONIA DECOMPOSITION METHOD

TECHNICAL FIELD

The present invention relates to an ammonia decomposition facility that decomposes ammonia, a gas turbine plant equipped with same, and an ammonia decomposition method.

Priority is claimed on Japanese Patent Application No. 2019-049013, filed Mar. 15, 2019, the content of which is incorporated herein by reference.

BACKGROUND ART

In order to reduce the amount of $CO_2$ emissions in order to protect the global environment, use of hydrogen, which does not emit $CO_2$ even when combusted, as a fuel, is a powerful option. However, for example, compared to fuels such as liquefied natural gas, which are widely used as fuels for gas turbines, it is not easy to transport and store hydrogen. Therefore, the use of ammonia that can be converted into hydrogen as a fuel has been studied.

The following Patent Document 1 describes a gas turbine plant including a decomposition device that heats ammonia and decomposes the ammonia into hydrogen and nitrogen. The decomposition device of the gas turbine plant exchanges heat between liquid ammonia pressurized by a pump and an exhaust gas exhausted from a gas turbine, heats ammonia, and thermally decomposes the ammonia to generate a decomposition gas containing hydrogen and nitrogen. The decomposition gas is directly guided to a combustor of the gas turbine.

In addition, the following Patent Document 2 also describes a gas turbine plant including a heating device that heats ammonia and decomposes the ammonia into hydrogen and nitrogen. The heating device of the gas turbine plant exchanges heat between liquid ammonia and an exhaust gas exhausted from the gas turbine, heats ammonia, and thermally decomposes the ammonia to generate a decomposition gas containing hydrogen and nitrogen. The decomposition gas is introduced into a combustor of the gas turbine. The thermal decomposition of ammonia is promoted when the pressure in the pyrolysis environment is low. Therefore, in Patent Document 2, 1 MPa is an exemplary example of the pressure of the ammonia pyrolysis environment. The gas turbine plant includes a decomposition gas compressor that pressurizes a decomposition gas to a pressure at which the decomposition gas from the heating device can be introduced into the combustor. In Patent Document 2, 5 MPa is an exemplary example of the pressure of the decomposition gas pressurized by the decomposition gas compressor, that is, the pressure at which the decomposition gas can be introduced into the combustor.

CITATION LIST

Patent Document

[Patent Document 1]
Japanese Unexamined Patent Application, First Publication No. H04-342829

[Patent Document 2]
Japanese Unexamined Patent Application, First Publication No. 2018-076794

SUMMARY OF INVENTION

Technical Problem

In the decomposition gas that is generated by thermal decomposition of ammonia, in addition to hydrogen and nitrogen, ammonia often remains. When the residual ammonia contained in the decomposition gas is combusted, it reacts with combustion air to generate NOx. NOx affects the external environment. Therefore, the amount of NOx emissions is regulated by environmental standards and the like.

Here, an object of the present invention is to provide an ammonia decomposition facility that can reduce the amount of residual ammonia, a gas turbine plant equipped with same, and an ammonia decomposition method.

Solution to Problem

An ammonia decomposition facility as one aspect according to the invention in order to achieve the above object, includes a heating medium line configured to flow a heating medium heated by heat generated by a gas turbine flows; an ammonia supply line configured to flow ammonia; an ammonia decomposition device that is connected to the heating medium line and the ammonia supply line, and is configured to use heat of the heating medium from the heating medium line, thermally decompose the ammonia from the ammonia supply line, and generate a decomposition gas containing hydrogen, nitrogen, and residual ammonia; an ammonia removal device configured to remove the residual ammonia contained in the decomposition gas from the ammonia decomposition device; and a processed gas supply line configured to guide a processed gas, which is a decomposition gas from which the residual ammonia has been removed by the ammonia removal device, to a gas utilization target.

The ammonia decomposition facility of this aspect includes, in addition to the ammonia decomposition device that thermally decomposes ammonia, an ammonia removal device that removes the residual ammonia from a decomposition gas containing hydrogen, nitrogen, and the residual ammonia generated by the ammonia decomposition device. Therefore, in this aspect, it is possible to reduce the concentration of the residual ammonia contained in the gas sent to the gas utilization target.

In addition, in this aspect, since heat generated by driving the gas turbine is used for ammonia thermal decomposition, energy costs for operating the ammonia decomposition facility can be further reduced compared with when a dedicated device for generating heat for thermal decomposition of ammonia is separately provided.

Here, the ammonia decomposition facility of the above aspect may include an ammonia recovery line that is connected to the ammonia removal device and is configured to guide the residual ammonia removed by the ammonia removal device to the ammonia supply line.

In this aspect, since the residual ammonia removed by the ammonia removal device returns to an ammonia supply line, the amount of waste in ammonia as a raw material can be minimized.

In addition, the ammonia decomposition facility according to any one of the above aspects may include an ammonia booster that is provided at the ammonia supply line and is configured to pressurize the ammonia flowing through the ammonia supply line to a pressure higher than a pressure in the gas utilization target Ammonia thermal decomposition is promoted in a low pressure environment. Therefore, a method in which ammonia is thermally decomposed in a low pressure environment and then pressurized by a booster in order to send the decomposed gas to the gas utilization target is conceivable. The volume of the gas after the ammonia decomposition reaction is twice the volume of ammonia gas before the reaction. Therefore, the size of the booster that pressurizes the gas after the decomposition reaction is larger than the size of the booster that pressurizes ammonia gas before the reaction. In addition, the boosting power of the booster that pressurizes the gas after the decomposition reaction is larger than the boosting power of the booster that pressurizes ammonia gas before the reaction. That is, this method increases facility costs and running costs. On the other hand, in this aspect, since ammonia before it is supplied to the ammonia decomposition device is pressurized to a pressure higher than the pressure in the gas utilization target by the ammonia booster, it can be guided into the gas utilization target even if the gas after decomposing ammonia is not pressurized. Therefore, in this aspect, it is possible to reduce facility costs and running costs.

In the ammonia decomposition facility according to any one of the above aspects, the ammonia removal device may include an ammonia absorber and an ammonia separator. In this case, the ammonia absorber is configured to bring the decomposition gas from the ammonia decomposition device into contact with water, dissolve the residual ammonia in the decomposition gas in the water and exhaust the processed decomposition gas. In addition, in this case, the ammonia separator includes a separation tower and a water heater. In the separation tower, ammonia water, which is the water in which the residual ammonia dissolves is configured to be brought into contact with water vapor, heat the ammonia water and separate ammonia from the ammonia water. The water heater is configured to heat water in which ammonia has been separated from the ammonia water to form water vapor, and then return the water vapor to the separation tower.

The ammonia decomposition facility of the above aspect including the water heater may further include a second heating medium line configured to flow a heating medium heated by heat generated by the gas turbine in addition to a first heating medium line, which is the heating medium line. In this case, the water heater is a heat exchanger that is configured to exchange heat between water in which ammonia has been separated from the ammonia water and the heating medium from the second heating medium line and form the water into water vapor.

In this aspect, since heat generated by driving the gas turbine is used to heat water, energy costs for operating the ammonia decomposition facility can be further reduced compared with when a dedicated device for generating heat for heating water is separately provided.

A gas turbine plant as one aspect according to the invention in order to achieve the above object includes the ammonia decomposition facility according to any one of the above aspects and the gas turbine. The gas turbine includes an air compressor configured to compress air to generate compressed air, a combustor configured to combust a fuel in the compressed air to generate a combustion gas, and a turbine configured to be driven by the combustion gas. In this case, the processed gas supply line is configured to guide the processed gas to the combustor using the combustor as the gas utilization target As described above, according to the ammonia decomposition facility of this aspect, it is possible to reduce the concentration of the residual ammonia contained in the gas sent to the gas utilization target. Therefore, in this aspect, it is possible to reduce the NOx concentration in the exhaust gas generated by combustion of the fuel by the combustor, which is the gas utilization target. In addition, in this aspect, when hydrogen containing no carbon is combusted, it is possible to reduce the amount of $CO_2$ in the exhaust gas generated by combustion of the fuel by the combustor, which is the gas utilization target.

A gas turbine plant as another aspect according to the invention in order to achieve the above object includes the ammonia decomposition facility according to any one of the above aspects, the gas turbine, and an exhaust heat recovery boiler configured to generate steam with heat of an exhaust gas exhausted from the gas turbine. In this case, the heating medium line is connected to the exhaust heat recovery boiler, and is configured to guide steam generated by the exhaust heat recovery boiler as the heating medium to the ammonia decomposition device.

A gas turbine plant as still another aspect of the invention in order to achieve the above object includes the ammonia decomposition facility according to the above aspect including the second heating medium line, the gas turbine, and an exhaust heat recovery boiler configured to generate steam with heat of an exhaust gas exhausted from the gas turbine. In this case, the second heating medium line is connected to the exhaust heat recovery boiler, and is configured to guide steam generated by the exhaust heat recovery boiler as the heating medium to the water heater.

Here, in the gas turbine plant according to still another aspect, the first heating medium line may be connected to the exhaust heat recovery boiler and be configured to guide steam generated by the exhaust heat recovery boiler as the heating medium to the ammonia decomposition device.

An ammonia decomposition method as one aspect according to the invention in order to achieve the above object executes an ammonia decomposition process in which ammonia is thermally decomposed in an ammonia decomposition device using heat of a heating medium heated by heat generated in a gas turbine and a decomposition gas containing hydrogen, nitrogen, and the residual ammonia is generated; an ammonia removal process in which the residual ammonia contained in the decomposition gas is removed; and a processed gas supply process in which a processed gas, which is a decomposition gas from which the residual ammonia has been removed in the ammonia remove process, is guided to a gas utilization target.

Here, in the ammonia decomposition method according to the above aspect, an ammonia recovery process in which the residual ammonia removed in the ammonia remove process is merged with ammonia before it is thermally decomposed in the ammonia decomposition process may be executed.

In addition, in the ammonia decomposition method according to any one of the above aspects, an ammonia supply process in which ammonia before it is thermally decomposed in the ammonia decomposition process is pressurized to a pressure higher than the pressure in the gas utilization target and the pressurized ammonia is then supplied to the ammonia decomposition device may be executed.

In addition, in the ammonia decomposition method according to any one of the above aspects, the ammonia remove process may include an ammonia absorption process and an ammonia separation process. In this case, in the ammonia absorption process, the decomposition gas obtained by executing the ammonia decomposition process is brought into contact with water, the residual ammonia in the decomposition gas dissolves in water, and the processed decomposition gas is discharged. In addition, in this case, the ammonia separation process includes a separation execution process and a water heating process. In the separation execution process, ammonia water, which is water in which the residual ammonia dissolves, is brought into contact with water vapor, and ammonia evaporates and is separated from the ammonia water. In the water heating process, water in which ammonia has been separated from the ammonia water is heated to form water vapor used in the separation execution process.

In the ammonia decomposition method according to the above aspect in which the water heating process is executed, in the water heating process, heat may be exchanged between water in which ammonia has been separated from the ammonia water and a heating medium heated by heat generated by the gas turbine, and the water may be heated.

In addition, in the ammonia decomposition method according to any one of the above aspects, in the processed gas supply process, the processed gas may be guided to a combustor using the combustor of the gas turbine as the gas utilization target.

In the ammonia decomposition method according to any one of the above aspects, the concentration of the residual ammonia in the processed gas may be set so that the concentration of nitrogen oxides in an exhaust gas exhausted from the gas turbine becomes a desired value. This desired value can be determined so that the concentration of nitrogen oxides in the exhaust gas becomes a value that conforms to the environmental regulations for the concentration of nitrogen oxides at an installation point of the present plant or the concentration of nitrogen oxides after denitration when a denitration device is provided at an exhaust gas path becomes a value that conforms to the environmental regulations.

Advantageous Effects of Invention

According to one aspect of the present invention, it is possible to reduce the residual ammonia in the decomposition gas generated by thermal decomposition of ammonia. In addition, according to one aspect of the present invention, it is possible to reduce energy costs for operating the ammonia decomposition facility.

DESCRIPTION OF EMBODIMENTS

Various embodiments and various modification examples of a gas turbine plant including an ammonia decomposition facility of the present invention will be described below with reference to the drawings.

First Embodiment

A gas turbine plant according to a first embodiment will be described with reference to FIG. 1 to FIG. 5.

Figure 1:
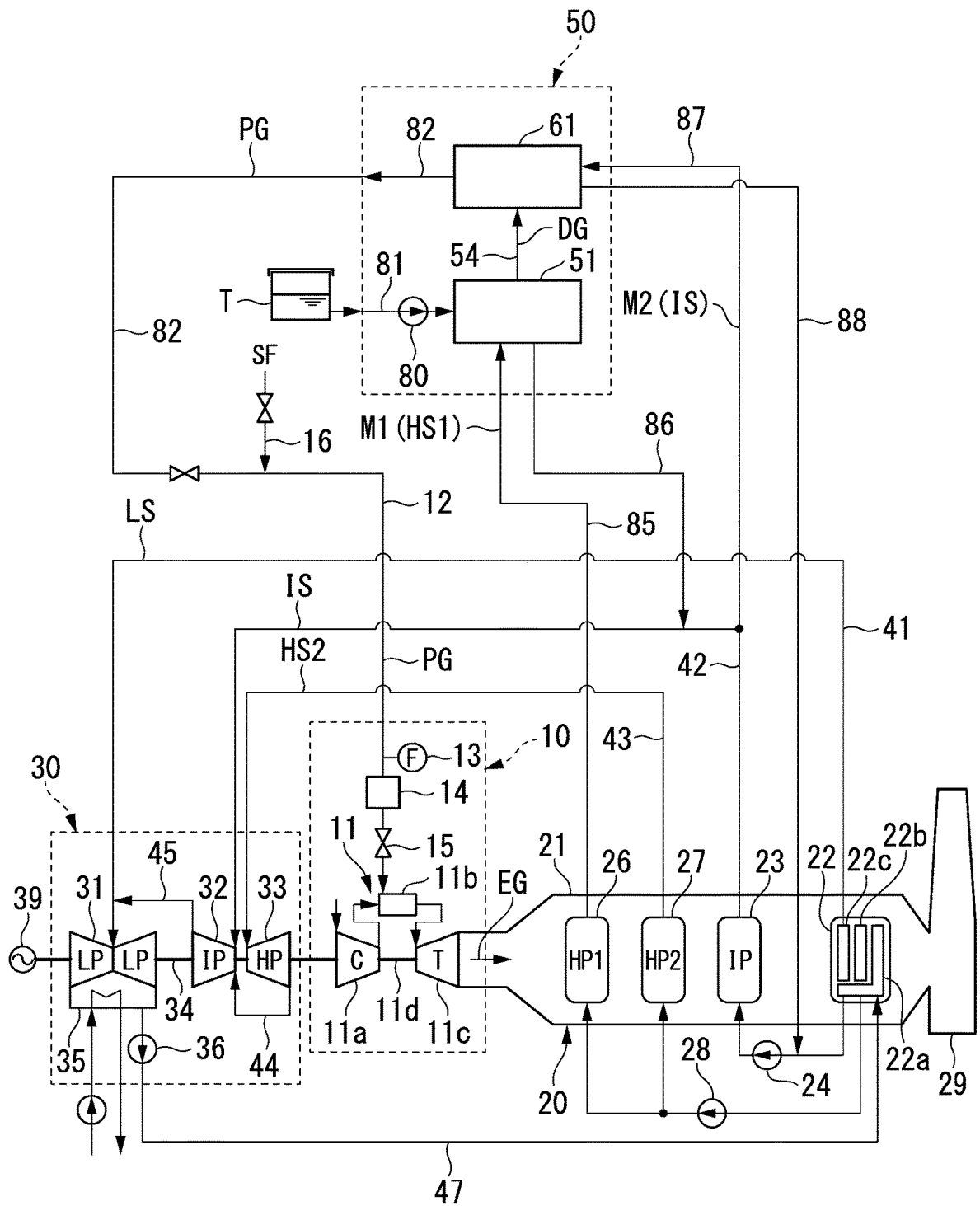
FIG. 1 is a system diagram of a gas turbine plant according to a first embodiment of the present invention.

As shown in FIG. 1, the gas turbine plant of the present embodiment includes a gas turbine facility 10, an exhaust heat recovery boiler 20, a steam turbine facility 30, and an ammonia decomposition facility 50.

The gas turbine facility 10 includes a gas turbine 11, a fuel line 12 that guides a fuel to the gas turbine 11, a flow meter 13 that detects a flow rate of a fuel that flows through the fuel line 12, a preheater 14 that preheats a fuel which flows through the fuel line 12, and a fuel control valve 15 that controls a flow rate of a fuel that is supplied to the gas turbine 11.

The gas turbine 11 includes an air compressor 11a that compresses air to generate compressed air, a combustor 11b that combusts a fuel in the compressed air to generate a combustion gas, and a turbine 11c that is driven by the combustion gas. The combustor 11b has a structure that can stably combust a gas fuel containing hydrogen as a main component. The air compressor 11a includes a compressor rotor and a compressor casing that covers the compressor rotor. The turbine 11c includes a turbine rotor and a turbine casing that covers the turbine rotor. The compressor rotor and the turbine rotor are connected to each other to form a gas turbine rotor 11d. The fuel line 12 is connected to the combustor 11b. The flow meter 13, the preheater 14, and the fuel control valve 15 described above are provided at the fuel line 12.

The exhaust heat recovery boiler 20 includes a boiler frame 21 through which an exhaust gas EG flows from the gas turbine 11, a low pressure steam generation system 22, a medium pressure steam generation system 23, a first high pressure steam generation system 26, a second high pressure steam generation system 27, a medium pressure pump 24, and a high pressure pump 28. Here, the upstream side along the flow of the exhaust gas EG in the boiler frame 21 is simply the upstream side and the opposite side is the downstream side. A stack 29 that exhausts the exhaust gas EG to the atmosphere is connected to the end of the boiler frame 21 on the furthest downstream side.

The low pressure steam generation system 22 includes an economizer 22a, an evaporator 22b, and a superheater 22c. The economizer 22a heats water into hot water by exchanging heat between water and the exhaust gas EG. The evaporator 22b heats water into water vapor by exchanging heat between some of the hot water from the economizer 22a and the exhaust gas EG. The superheater 22c overheats water vapor by exchanging heat between the water vapor from the evaporator 22b and the exhaust gas EG. The economizer 22a, at least a part of the evaporator 22b, and the superheater 22c are all arranged in the boiler frame 21. The economizer 22a, at least a part of the evaporator 22b, and the superheater 22c are arranged in this order from the downstream side to the upstream side.

Although the medium pressure steam generation system 23, the first high pressure steam generation system 26, and the second high pressure steam generation system 27 are not shown, all of them include an economizer, an evaporator, and a superheater, like the low pressure steam generation system 22. The medium pressure pump 24 pressurizes some of the hot water from the economizer 22a of the low pressure steam generation system 22 and then sends it to the economizer of the medium pressure steam generation system 23. The high pressure pump 28 pressurizes the other part of the hot water from the economizer 22a of the low pressure steam generation system 22 and then sends it to the economizer of the first high pressure steam generation system 26 and the economizer of the second high pressure steam generation system 27.

Among the superheaters of the steam generation systems 22, 23, 26, and 27, the superheater of the first high pressure steam generation system 26 is arranged in the boiler frame 21 upstream from the other superheaters. The superheater of the second high pressure steam generation system 27 is arranged downstream from the superheater of the first high pressure steam generation system 26 in the boiler frame 21. The superheater of the medium pressure steam generation system 23 is arranged downstream from the superheater of the second high pressure steam generation system 27 in the boiler frame 21. The superheater 22c of the low pressure steam generation system 22 is arranged downstream from the superheater of the medium pressure steam generation system 23 in the boiler frame 21.

The steam turbine facility 30 includes a low pressure steam turbine 31, a medium pressure steam turbine 32, a high pressure steam turbine 33, a steam condenser 35, and a condensate pump 36. The low pressure steam turbine 31 includes a low pressure steam turbine rotor and a casing that covers the low pressure steam turbine rotor. The medium pressure steam turbine 32 includes a medium pressure steam turbine rotor and a casing that covers the medium pressure steam turbine rotor. The high pressure steam turbine 33 includes a high pressure steam turbine rotor and a casing that covers the high pressure steam turbine rotor. The low pressure steam turbine rotor, the medium pressure steam turbine rotor, and the high pressure steam turbine rotor are connected to each other to form one steam turbine rotor 34. The gas turbine rotor 11d described above is connected to one end of the steam turbine rotor 34. In addition, a generator 39 is connected to the other end of the steam turbine rotor 34.

The superheater of the second high pressure steam generation system 27 and a steam inlet of the high pressure steam turbine 33 are connected by a high pressure steam line 43. The superheater of the medium pressure steam generation system 23 and a steam inlet of the medium pressure steam turbine 32 are connected by a medium pressure steam line 42. The steam inlet of the medium pressure steam turbine 32 is additionally connected to the steam outlet of the high pressure steam turbine 33 by a high pressure exhaust steam line 44. The superheater 22c of the low pressure steam generation system 22 and a steam inlet of the low pressure steam turbine 31 are connected by a low pressure steam line 41. The steam inlet of the low pressure steam turbine 31 is additionally connected to a steam outlet of the medium pressure steam turbine 32 by a medium pressure exhaust steam line 45. The steam condenser 35 described above is connected to a steam outlet of the low pressure steam turbine 31. The steam condenser 35 returns the steam exhausted from the low pressure steam turbine 31 to liquid-phase water. The steam condenser 35 and the economizer 22a of the low pressure steam generation system 22 are connected by a water supply line 47. The condensate pump 36 described above is provided at the water supply line 47.

The ammonia decomposition facility 50 includes an ammonia supply line 81, an ammonia booster 80, an ammonia decomposition device 51, an ammonia removal device 61, and a processed gas supply line 82.

The ammonia supply line 81 connects an ammonia tank T in which liquid ammonia is stored and the ammonia decomposition device 51. The liquid ammonia stored in the ammonia tank T is produced, for example, using hydrogen as a raw material. This hydrogen is, for example, hydrogen obtained by electrolyzing water using electricity generated with renewable energy such as wind power and solar power or hydrogen obtained by steam reforming natural gas. Compared to liquefied natural gas, it is not easy to transport and store hydrogen. Therefore, using the hydrogen obtained as described above, liquid ammonia that can be easily transported and stored is produced, and this liquid ammonia is stored in the ammonia tank T. The ammonia booster 80 is provided at the ammonia supply line 81. The ammonia booster 80 is a pump. The ammonia booster 80 pressurizes liquid ammonia that flows through the ammonia supply line 81. The ammonia decomposition device 51 uses heat of a first heating medium M1, thermally decomposes ammonia from the ammonia supply line 81, and generates a decomposition gas DG containing hydrogen, nitrogen, and the residual ammonia. The ammonia removal device 61 removes the residual ammonia contained in the decomposition gas DG from the ammonia decomposition device 51. Here, in the following, the decomposition gas DG from which the residual ammonia is removed in the ammonia removal device 61 is defined as a processed gas PG. The processed gas supply line 82 guides the processed gas PG to a gas utilization target.

The gas utilization target in the present embodiment is the combustor 11b of the gas turbine 11. As described above, the fuel line 12 is connected to the combustor 11b. The processed gas supply line 82 described above connects the ammonia removal device 61 to the fuel line 12. A start-up fuel line 16 through which a start-up fuel SF flows is additionally connected to the fuel line 12.

Figure 2:
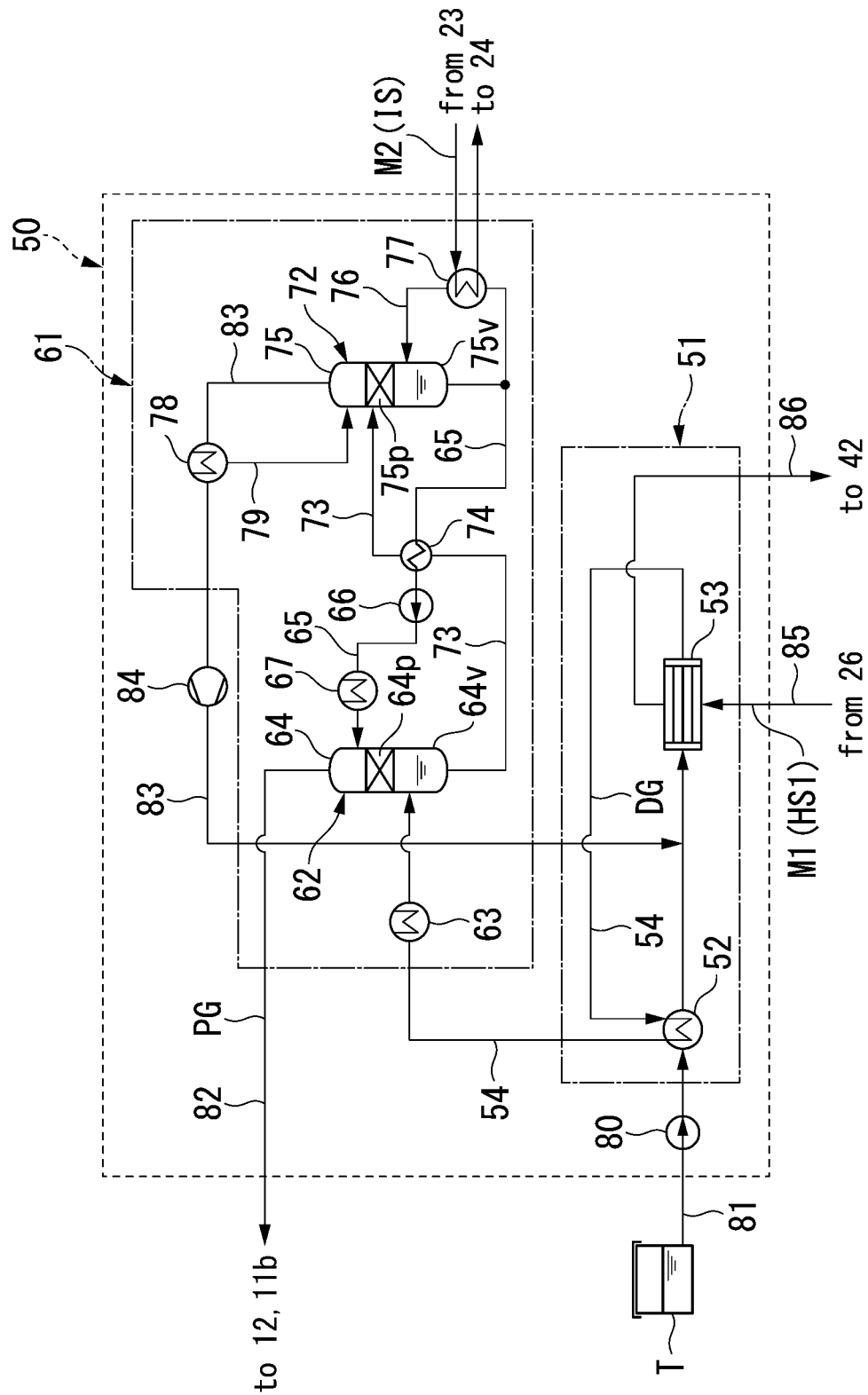
FIG. 2 is a system diagram of an ammonia decomposition facility according to the first embodiment of the present invention.
Figure 3:
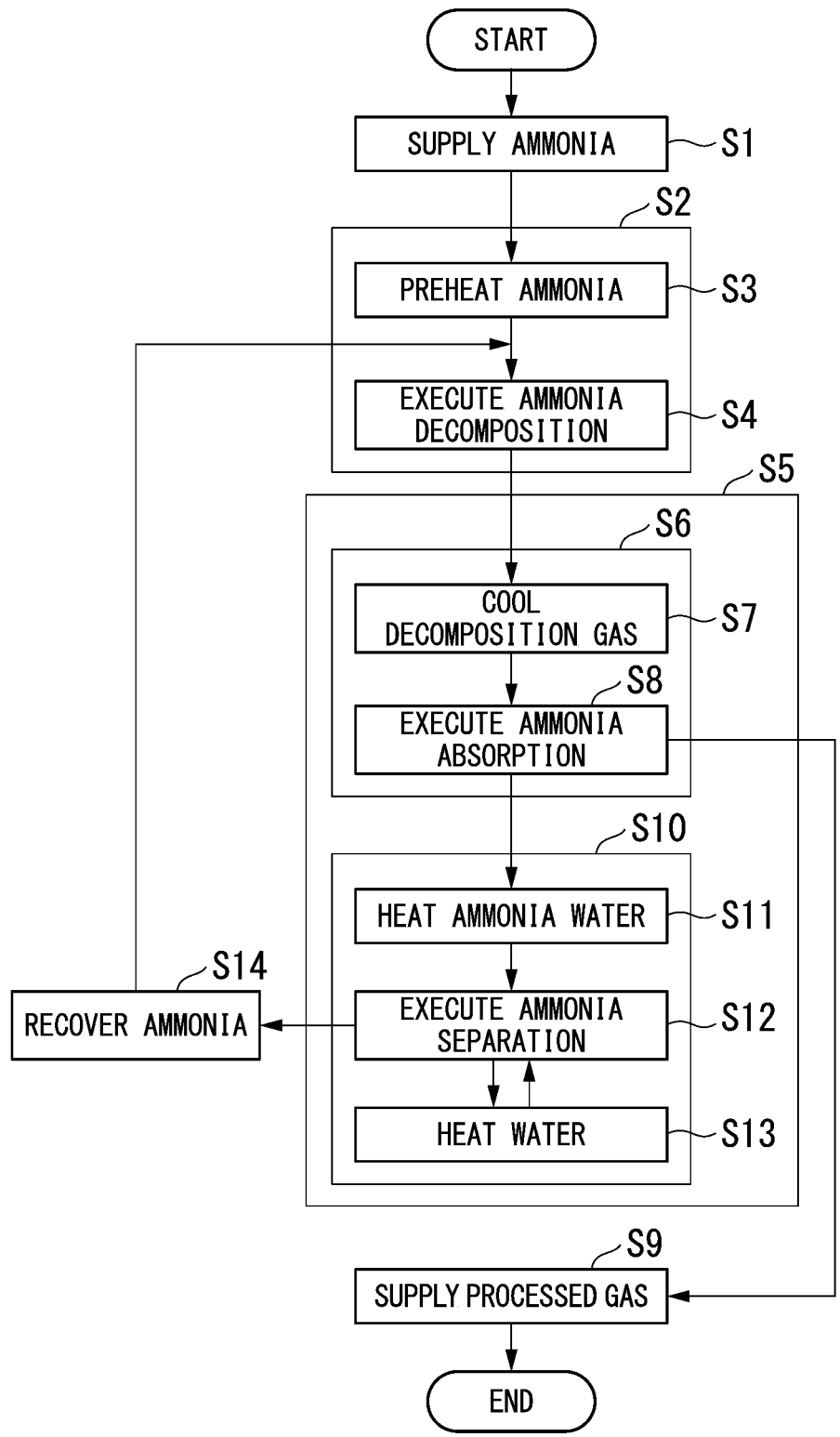
FIG. 3 is a flowchart showing an ammonia decomposition procedure performed by an ammonia decomposition device according to the first embodiment of the present invention.

As shown in FIG. 2, the ammonia decomposition device 51 includes an ammonia heater 52 and an ammonia decomposer 53.

The ammonia heater 52 is provided at the ammonia supply line 81. The ammonia heater 52 is a heat exchanger that exchanges heat between liquid ammonia which flows through the ammonia supply line 81 and the decomposition gas DG. The ammonia heater 52 heats liquid ammonia by exchanging heat between the liquid ammonia and the decomposition gas DG, and transitions the liquid ammonia to gas-phase ammonia.

The ammonia decomposer 53 is a heat exchanger that exchanges heat between gas-phase ammonia from the ammonia supply line 81 and the first heating medium M1. The ammonia decomposer 53 heats ammonia by exchanging heat between ammonia and the first heating medium M1, thermally decomposes ammonia, and generates a decomposition gas DG containing hydrogen, nitrogen, and the residual ammonia. The inside of the ammonia decomposer 53 is divided into a target gas space through which ammonia or the decomposition gas DG flows and a medium space through which the first heating medium M1 flows by a heat transfer wall formed of a heat transfer tube or the like. The heat transfer wall is formed of, for example, Ni steel. The target gas space is filled with a catalyst for promoting thermal decomposition of ammonia. This catalyst includes a catalyst component that activates a decomposition reaction and a carrier that supports the catalyst component. Examples of catalyst components include particles of precious metals such as Ru and metal particles containing transition metals such as Ni, Co, and Fe. Examples of carriers include metal oxides such as $Al_2O_3$, $ZrO_2$, $Pr_2O_3$, $La_2O_3$, and MgO. Here, the catalyst is not limited to the catalysts provided as exemplary examples above as long as it activates a decomposition reaction of ammonia.

A decomposition gas line 54 that guides the decomposition gas DG generated in the ammonia decomposer 53 to the ammonia removal device 61 is connected to the ammonia decomposer 53. The ammonia heater 52 described above is provided at the decomposition gas line 54. Therefore, in the ammonia heater 52, the decomposition gas DG that is a target of which heat is exchanged with liquid ammonia is a decomposition gas DG that has passed through the decomposition gas line 54 from the ammonia decomposer 53.

As shown in FIG. 1 and FIG. 2, the ammonia decomposition facility 50 further includes a first heating medium line 85 and a first heating medium recovery line 86.

The first heating medium line 85 connects the superheater of the first high pressure steam generation system 26 to the ammonia decomposer 53 of the ammonia decomposition device 51. The first heating medium line 85 guides a first high pressure steam HS1 from the superheater of the first high pressure steam generation system 26 to the ammonia decomposer 53. The ammonia decomposer 53 thermally decomposes ammonia using the first high pressure steam HS1 from the first heating medium line 85 as the first heating medium M1. The first heating medium recovery line 86 connects the ammonia decomposer 53 to the medium pressure steam line 42. The first heating medium recovery line 86 guides the first high pressure steam HS1 after it is used in the ammonia decomposer 53 into the medium pressure steam line 42.

As shown in FIG. 2, the ammonia removal device 61 includes an ammonia absorber 62 and an ammonia separator 72.

The ammonia absorber 62 includes a decomposition gas cooler 63, an absorption tower 64, a water line 65, a water supply pump 66, and a water cooler 67. The decomposition gas line 54 described above is connected to the absorption tower 64. The decomposition gas cooler 63 is provided closer to the absorption tower 64 than the ammonia heater 52 in the decomposition gas line 54. The decomposition gas cooler 63 additionally cools the decomposition gas DG cooled by exchanging heat with liquid ammonia in the ammonia heater 52. The absorption tower 64 includes an absorption tower container 64v and a filling material 64p. The filling material 64p is arranged in a medium basin in the absorption tower container 64v in the vertical direction. The decomposition gas line 54 is connected below the medium region in the absorption tower container 64v. The water line 65 is connected above the medium region in the absorption tower container 64v. In the water line 65, the water supply pump 66 that pressurizes water which flows through the water line 65 and the water cooler 67 that cools water which flows through the water line 65 are provided. The processed gas supply line 82 described above is connected to the top of the absorption tower container 64v. Therefore, the processed gas supply line 82 connects the absorption tower 64 to the fuel line 12.

The decomposition gas DG cooled by the decomposition gas cooler 63 flows into the absorption tower container 64v from below the medium region of the absorption tower container 64v. In addition, water cooled by the water cooler 67 is sprayed into the absorption tower container 64v from above the medium region of the absorption tower container 64v. The decomposition gas DG that has flowed into the absorption tower container 64v rises in the absorption tower container 64v. On the other hand, water sprayed into the absorption tower container 64v descends in the absorption tower container 64v. In a procedure of descending water in the absorption tower container 64v, water comes into contact with the filling material 64p. Water in contact with the filling material 64p forms a water film that covers the surface of the filling material 64p. In a procedure of rising the decomposition gas DG in the absorption tower container 64v, the gas comes into contact with a water film that covers the surface of the filling material 64p. In this procedure, the residual ammonia contained in the decomposition gas DG dissolves in water. Ammonia water, which is water in which the residual ammonia is dissolved, accumulates in a lower part of the absorption tower container 64v. The processed gas PG, which is the decomposition gas DG from which the residual ammonia has been removed, rises in the absorption tower container 64v and flows into the processed gas supply line 82.

The ammonia separator 72 includes an ammonia water line 73, an ammonia water heater 74, a separation tower 75, a water circulation line 76, a water heater 77, and a condenser 78. One end of the ammonia water line 73 is connected to the bottom of the absorption tower container 64v. The separation tower 75 includes a separation tower container 75v and a perforated plate type tray 75p. A plurality of stages constituting the tray 75p are arranged side by side in the vertical direction in the medium basin in the separation tower container 75v in the vertical direction. The other end of the ammonia water line 73 described above is connected to a medium stage among the plurality of stages constituting the tray 75p. One end of the water circulation line 76 is connected to the bottom of the separation tower container 75v, and the other end of the water circulation line 76 is connected above the bottom and below the medium region in the separation tower container 75v. The water heater 77 is provided at the water circulation line 76. The water heater 77 is a heat exchanger that exchanges heat between water which flows through the water circulation line 76 and a second heating medium M2. The water heater 77 heats water by exchanging heat between water and the second heating medium M2 and forms this water into water vapor. This water vapor flows into the separation tower container 75v via the water circulation line 76.

Water vapor flows into the separation tower container 75v from below the medium region in the separation tower container 75v. In addition, ammonia water from the ammonia water line 73 is sprayed into the separation tower container 75v from the medium stage in the tray 75p. The water vapor that has flowed into the separation tower container 75v rises in the separation tower container 75v. The ammonia water sprayed from the medium stage in the tray 75p gradually flows down to the lower stage while forming a liquid layer on each stage of the tray 75p. The water vapor rises in gas-liquid contact with ammonia water via a large number of holes provided in each stage of the tray 75p and heats the ammonia water. Ammonia, which evaporates more easily than water, is heated with water vapor, which is gas-phase water, and transitions from a liquid phase to a gas phase, and water transitions from a gas phase to a liquid phase. Gas-phase ammonia rises in the separation tower 75. In addition, liquid-phase water, more accurately, water with a low ammonia concentration, accumulates in a lower part of the separation tower container 75v. Some of this water flows as water vapor again into the separation tower container 75v via the water circulation line 76 and the water heater 77.

The water line 65 of the ammonia absorber 62 is connected to the water circulation line 76. Therefore, some of the water accumulated in the lower part of the separation tower container 75v returns again into the separation tower container 75v via the water circulation line 76, and the other part of the water accumulated in the lower part of the separation tower container 75v flows into the absorption tower 64 via the water circulation line 76 and the water line 65.

The ammonia water heater 74 is provided at the ammonia water line 73. The ammonia water heater 74 is a heat exchanger that exchanges heat between ammonia water which flows through the ammonia water line 73 and water which flows through the water line 65. The ammonia water heater 74 heats ammonia water by exchanging heat between ammonia water and water. As described above, the heated ammonia water is sprayed into the separation tower container 75v. On the other hand, water cooled by heat exchange with ammonia water is sprayed into the absorption tower container 64v via the water line 65, the water supply pump 66, and the water cooler 67.

As shown in FIG. 1 and FIG. 2, the ammonia decomposition facility 50 further includes an ammonia recovery line 83, an ammonia compressor 84, a second heating medium line 87, and a second heating medium recovery line 88.

One end of the ammonia recovery line 83 is connected to the top of the separation tower container 75v, and the other end of the ammonia recovery line 83 is connected to the ammonia supply line 81. The ammonia compressor 84 pressurizes gas-phase ammonia that flows through the ammonia recovery line 83. The gas-phase ammonia pressurized by the ammonia compressor 84 merges with gas-phase ammonia that flows through the ammonia supply line 81 and then flows into the ammonia decomposer 53. The condenser 78 is provided at the ammonia recovery line 83. The condenser 78 cools a gas containing gas-phase ammonia that flows through the ammonia recovery line 83, and condenses water and ammonia in the gas. The water condensed by the condenser 78 returns to a space above the tray 75p in the separation tower container 75v via a water recovery line 79. The number of stages of the tray 75p is planned according to the number of stages required for this ammonia water with a high concentration to become a small amount of ammonia water with a desired concentration. Here, the concentration of ammonia water supplied from the ammonia water line 73 is lower than the concentration of water with a high concentration of ammonia discharged from the condenser 78. Therefore, the number of stages of the tray required for separating ammonia water supplied from the ammonia water line 73 is smaller than the number of stages planned for ammonia water with a high concentration from the condenser 78. Therefore, a connection destination of ammonia water supplied from the ammonia water line 73 is a medium stage among the plurality of stages constituting the tray 75p.

The second heating medium line 87 connects the medium pressure steam line 42 to the water heater 77. The second heating medium line 87 guides a medium pressure steam IS that flows through the medium pressure steam line 42 to the water heater 77. The water heater 77 uses the medium pressure steam IS from the second heating medium line 87 as the second heating medium M2 in order to heat water. The second heating medium recovery line 88 connects the water heater 77 to a suction port at the medium pressure pump 24 of the exhaust heat recovery boiler 20. The second heating medium recovery line 88 guides hot water generated by condensation of the medium pressure steam IS of which heat is exchanged with water in the water heater 77 to the medium pressure pump 24.

Next, operations and actions of the gas turbine plant described above will be described.

When the gas turbine 11 starts, a start-up fuel SF is supplied to the combustor 11b via the start-up fuel line 16 and the fuel line 12. The start-up fuel SF may be, for example, hydrogen or natural gas. As described above, the air compressor 11a of the gas turbine 11 compresses air to generate compressed air. The combustor 11b combusts the start-up fuel SF in the compressed air to generate a combustion gas. This combustion gas is supplied to the turbine 11c, and drives the turbine 11c. The exhaust gas EG, which is the combustion gas that drives the turbine 11c, flows into the boiler frame 21 of the exhaust heat recovery boiler 20.

In the steam generation systems 22, 23, 26, and 27 of the exhaust heat recovery boiler 20, the exhaust gas EG that flows through the boiler frame 21 and water are caused to exchange heat, and liquid-phase water transitions to water vapor. Some of hot water from the economizer 22a of the low pressure steam generation system 22 is pressurized by the high pressure pump 28 and then sent to the first high pressure steam generation system 26 and the second high pressure steam generation system 27. The hot water sent to the first high pressure steam generation system 26 transitions to the first high pressure steam HS1 by heat exchange with the exhaust gas EG. The first high pressure steam HS1 is, for example, overheated steam at about 620° C. The first high pressure steam HS1 as the first heating medium M1 flows into the ammonia decomposer 53 via the first heating medium line 85. The hot water sent to the second high pressure steam generation system 27 transitions to a second high pressure steam HS2 by heat exchange with the exhaust gas EG. The second high pressure steam HS2 is, for example, overheated steam at about 400° C. The second high pressure steam HS2 is supplied to the high pressure steam turbine 33 via the high pressure steam line 43. The high pressure steam turbine 33 is driven by the second high pressure steam HS2.

Some of hot water from the economizer 22a of the low pressure steam generation system 22 is pressurized by the medium pressure pump 24 and then sent to the medium pressure steam generation system 23. The hot water sent to the medium pressure steam generation system 23 transitions to a medium pressure steam IS by heat exchange with the exhaust gas EG. The medium pressure steam IS is, for example, overheated steam at 300° C. Some of the medium pressure steam IS as the second heating medium M2 flows into the water heater 77 of the ammonia separator 72 via the medium pressure steam line 42 and the second heating medium line 87. The rest of the medium pressure steam IS is supplied to the medium pressure steam turbine 32 via the medium pressure steam line 42. In addition, the steam exhausted from the high pressure steam turbine 33 is supplied to the medium pressure steam turbine 32 via the high pressure exhaust steam line 44. That is, the medium pressure steam IS from the medium pressure steam generation system 23 and the steam exhausted from the high pressure steam turbine 33 are supplied to the medium pressure steam turbine 32. The medium pressure steam turbine 32 is driven by the steam supplied to the medium pressure steam turbine 32.

Some of the hot water from the economizer 22a of the low pressure steam generation system 22 is heated with the exhaust gas EG and made into steam by the evaporator 22b of the low pressure steam generation system 22. This steam is overheated with the exhaust gas EG in the superheater 22c of the low pressure steam generation system 22 and becomes a low pressure steam LS. The low pressure steam LS is, for example, overheated steam at 250° C. The low pressure steam LS is supplied to the low pressure steam turbine 31 via the low pressure steam line 41. In addition, the steam exhausted from the medium pressure steam turbine 32 is supplied to the low pressure steam turbine 31 via the medium pressure exhaust steam line 45. That is, the low pressure steam LS from the low pressure steam generation system 22 and the steam exhausted from the medium pressure steam turbine 32 are supplied to the low pressure steam turbine 31. The low pressure steam turbine 31 is driven by the steam supplied to the low pressure steam turbine 31.

The steam exhausted from the low pressure steam turbine 31 returns to water by the steam condenser 35. Water in the steam condenser 35 is sent to the economizer 22a of the low pressure steam generation system 22 via the water supply line 47.

When steam from the exhaust heat recovery boiler 20 is sufficiently supplied to the steam turbines 31, 32, and 33, the ammonia decomposer 53, and the water heater 77 of the ammonia separator 72, liquid ammonia in the ammonia tank T is supplied to the ammonia decomposition device 51 via the ammonia supply line 81. Hereinafter, an ammonia decomposition procedure performed by the ammonia decomposition facility 50 will be described with reference to the flowchart shown in FIG. 3.

Liquid ammonia which is cooled at a temperature of −33.4° C., which is its boiling point, or lower and in a substantially atmospheric pressure state is stored in the ammonia tank T. The liquid ammonia in the ammonia tank T is pressurized to, for example, about 5.2 MPa (absolute pressure), by the ammonia booster 80 and then supplied to the ammonia decomposition device 51 (S1: ammonia supply process). The pressure after pressurization of ammonia is a pressure determined in consideration of the pressure loss in pipes and various devices in the path until liquid ammonia becomes a processed gas PG and the processed gas PG flows into the combustor 11b, and is a pressure at which the processed gas PG can be supplied into the combustor 11b into which compressed air flows without boosting up the processed gas PG. Therefore, this pressure is higher than the pressure in the combustor 11b, which is the gas utilization target.

Liquid ammonia is pressurized by the ammonia booster 80 and then flows into the ammonia decomposition device 51, and the liquid ammonia is decomposed (S2: ammonia decomposition process). In the ammonia decomposition process (S2), an ammonia preheating process (S3) and an ammonia decomposition execution process (S4) are executed. The liquid ammonia pressurized by the ammonia booster 80 flows into the ammonia heater 52 of the ammonia decomposition device 51. Here, the liquid ammonia that has flowed into the ammonia heater 52 is heated to about 400° C. Liquid ammonia evaporates to gas ammonia at 90° C. or higher in a pressure environment in which pressurization is performed by the ammonia booster 80. Therefore, the liquid ammonia is heated by the ammonia heater 52 and becomes gas ammonia at about 400° C. (S3: ammonia preheating process).

Gas ammonia at about 400° C. flows into the ammonia decomposer 53 of the ammonia decomposition device 51. In the ammonia decomposer 53, heat is exchanged between the gas ammonia at about 400° C. and the first high pressure steam HS1 at about 620° C. from the first high pressure steam generation system 26. The first high pressure steam HS1, which is the first heating medium M1, is cooled to about 400° C. by heat exchange, and flows into the medium pressure steam turbine 32 via the first heating medium recovery line 86 and the medium pressure steam line 42. On the other hand, gas ammonia is heated to about 600° C. by heat exchange and a part of gas ammonia is thermally decomposed into hydrogen and nitrogen (S4: ammonia decomposition execution process). According to this thermal decomposition, a decomposition gas DG containing hydrogen, nitrogen, and the residual ammonia is generated.

Then, the decomposition gas DG at about 600° C. flows into the ammonia heater 52, and exchanges heat with liquid ammonia in the ammonia heater 52. Therefore, as described above, while the liquid ammonia is heated and becomes gas ammonia at about 400° C., the decomposition gas DG is cooled to about 50° C. Thus, the ammonia decomposition process (S2) is completed.

Here, a gas ammonia pyrolysis reaction will be briefly described. As shown in the following formula, since the pyrolysis reaction is a reaction in which the number of moles after the reaction increases, the reaction is promoted at a lower pressure. In other words, this pyrolysis reaction is inhibited at a higher pressure. In addition, since this pyrolysis reaction is an endothermic reaction, the reaction is promoted at a higher temperature.

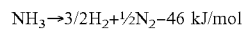

$$NH_3 \rightarrow 3/2H_2 + 1/2N_2 - 46 \text{ kJ/mol}$$

The heating value of $NH_3$ on the left side of the above formula is 317 kJ. On the other hand, the heating value of $3/2H_2$ on the right side of the above formula is 363 kJ. Therefore, due to the pyrolysis reaction, the heating value increases by 46 kJ. Therefore, there is no decrease in principle efficiency due to the ammonia pyrolysis reaction.

Figure 4:
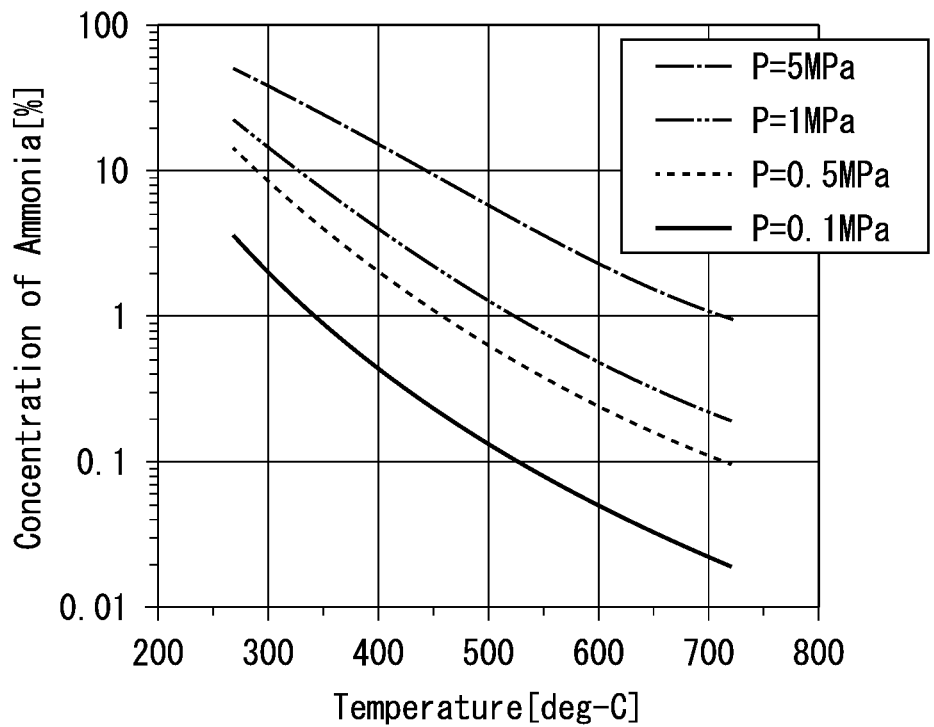
FIG. 4 is a graph showing the relationship between various temperatures and various pressures and the concentration of the residual ammonia in an ammonia pyrolysis environment.

Here, the concentration of the residual ammonia remaining after the gas ammonia pyrolysis reaction under various conditions will be described with reference to the graph shown in FIG. 4. Here, in this graph, the horizontal axis represents the temperature in a pyrolysis reaction environment (Temperature [deg-C.]), and the vertical axis represents the concentration of the residual ammonia (Concentration of Ammonia [%]). This graph shows the results obtained by calculating the concentration corresponding to each temperature and each pressure using the equilibrium constant of the pyrolysis reaction by changing the temperature and the pressure in the pyrolysis reaction environment. The temperature in the pyrolysis reaction environment in the present embodiment is 600° C., and the pressure in the pyrolysis reaction environment is 5.2 MPa. Therefore, in the present embodiment, the concentration of the residual ammonia after the pyrolysis reaction is about 4%. Therefore, the decomposition gas DG flowing from the ammonia decomposer 53 contains about 72 mol % of hydrogen, about 24 mol % of nitrogen, and about 4 mol % of the residual ammonia.

When the ammonia decomposition process (S2) is completed, an ammonia removal process (S5) in which the residual ammonia is removed from the decomposition gas DG obtained in the ammonia decomposition process (S2) is executed. In the ammonia removal process (S5), an ammonia absorption process (S6) and an ammonia separation process (S10) are executed.

In the ammonia absorption process (S6), first, the decomposition gas DG at about 50° C. is cooled by the decomposition gas cooler 63 of the ammonia absorber 62 and reaches about 30° C. (S7: decomposition gas cooling process). The decomposition gas DG flows into the absorption tower 64 of the ammonia absorber 62. Water at about 30° C. cooled by the water cooler 67 is sprayed into the absorption tower 64. As described above, in the absorption tower 64, the decomposition gas DG comes into contact with water, and the residual ammonia in the decomposition gas DG dissolves in water. Ammonia water, which is water in which the residual ammonia dissolves, is accumulated in a lower part of the absorption tower container 64v (S8: ammonia absorption execution process). The concentration of ammonia in the ammonia water is about 10 mol %. The concentration at which gas-phase ammonia dissolves in water is determined by the gas-liquid equilibrium constant. The concentration at which the gas-phase ammonia dissolves in water is higher at a lower temperature. Therefore, the temperature of the decomposition gas DG flowing into the absorption tower 64 and the temperature of water are set to about 30° C.

Thus, the ammonia absorption process (S6) is completed.

The processed gas PG, which is the decomposition gas DG from which the residual ammonia has been removed, rises in the absorption tower container 64v, and flows into the processed gas supply line 82. In the present embodiment, when the mass flow rate of water sprayed into the absorption tower 64 is made the same as the mass flow rate of the decomposition gas DG flowing into the absorption tower 64, the concentration of the residual ammonia contained in the processed gas PG is about 0.03 mol %.

When the gas turbine 11 starts, the temperature of the ammonia decomposer 53 and the internal fluid is low, and the ammonia decomposition reaction is unlikely to occur in this condition, most of the composition of the decomposition gas DG generated from the ammonia decomposer 53 becomes a the residual ammonia component. Since the residual ammonia component is removed by the absorption tower 64, the flow rate of the processed gas PG supplied from the processed gas supply line 82 to the gas turbine 11 is smaller than the planned value. After some time has passed after the gas turbine 11 starts, when a predetermined amount of the first heating medium M1 is supplied from the exhaust heat recovery boiler 20 to the ammonia decomposer 53, the temperature of the ammonia decomposer 53 and the internal fluid reaches the planned value, and the ammonia decomposition reaction is promoted. As a result, most of the composition of the decomposition gas DG becomes hydrogen and nitrogen, and the processed gas PG is generated from the absorption tower 64 with a sufficient flow rate. According to this procedure, the fuel supplied to the combustor 11b is gradually switched from the start-up fuel SF to the processed gas PG. That is, when the processed gas PG is sufficiently generated, the supply of the start-up fuel SF to the combustor 11b is stopped, and the processed gas PG is supplied to the combustor 11b via the processed gas supply line 82 and the fuel line 12 (S9: processed gas supply process). Here, in the present embodiment, in order to secure stability of supply of a fuel to the combustor 11b when the start-up fuel SF is switched to the processed gas PG, a fuel gas buffer may be provided at a part in which the start-up fuel line 16 and the processed gas supply line 82 merge. The processed gas PG supplied to the combustor 11b is combusted in the combustor 11b. The temperature of the combustion gas generated as a result of this combustion is 1,650° C. grade. The combustion gas flows into the turbine 11c to drive the turbine 11c.

The exhaust gas EG exhausted from the turbine 11c flows into the exhaust heat recovery boiler 20. In the low pressure steam generation system 22 of the exhaust heat recovery boiler 20, as described above, water is heated with the exhaust gas EG to generate a low pressure steam LS. The low pressure steam LS is overheated steam at about 250° C. In the medium pressure steam generation system 23 of the exhaust heat recovery boiler 20, as described above, water is heated with the exhaust gas EG to generate a medium pressure steam IS. The medium pressure steam IS is overheated steam at about 300° C. In the second high pressure steam generation system 27 of the exhaust heat recovery boiler 20, as described above, water is heated with the exhaust gas EG to generate a second high pressure steam HS2. The second high pressure steam HS2 is overheated steam at about 400° C. In the first high pressure steam generation system 26 of the exhaust heat recovery boiler 20, as described above, water is heated with the exhaust gas EG to generate a first high pressure steam HS1. The first high pressure steam HS1 is overheated steam at about 620° C. As described above, the first high pressure steam HS1 as the first heating medium M1 flows into the ammonia decomposer 53. In addition, as described above, some of the medium pressure steam IS as the second heating medium M2 flows into the water heater 77 of the ammonia separator 72.

Here, the relationship between the concentration of the residual ammonia contained in the fuel and the concentration of NOx in the exhaust gas EG exhausted from the gas turbine 11 will be described with reference to the graph shown in FIG. 5. Here, in this graph, the horizontal axis represents the concentration of the residual ammonia (Concentration of Ammonia [%]), and the vertical axis represents the predicted value of the concentration of NOx in the exhaust gas EG (NOx Prediction [ppm@15% $O_2$]). The predicted value of the NOx concentration is a value calculated by the inventors by modeling one-dimensional premixed flames using PREMIX code of CHEMKIN. Here, CHEMKIN is a calculation program. CHEMKIN is described in detail in the following document.

Document: R. J. Kee, F. M. Rupley, and J. A. Miller, Chemkin-II: A Fortran Chemical Kinetics Package for the Analysis of Gas-Phase Chemical Kinetics, Sandia Report, SAND89-8009B (1995)

Figure 5:
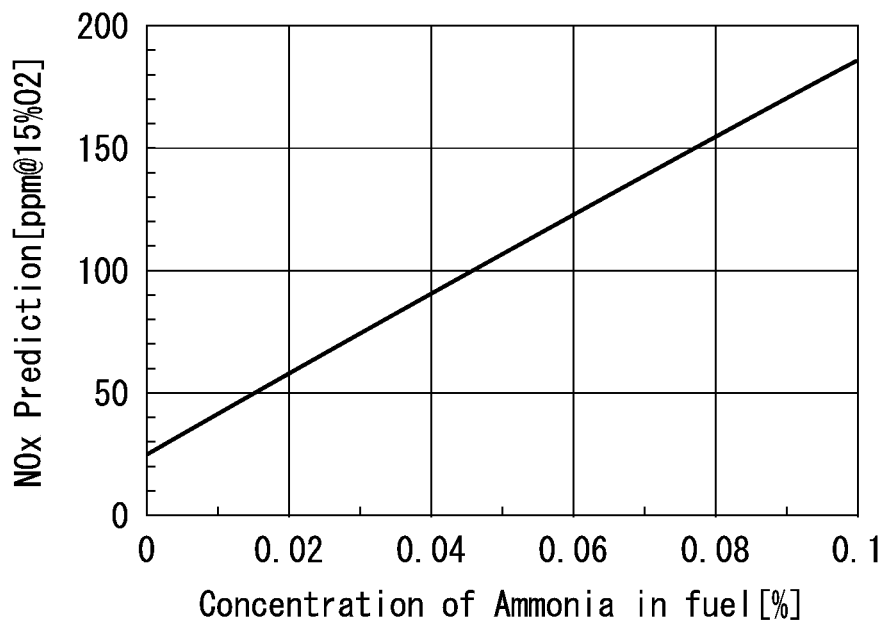
FIG. 5 is a graph showing the relationship between the concentration of the residual ammonia and a predicted value of the concentration of NOx in an exhaust gas.

In the present embodiment, since the concentration of the residual ammonia in the fuel is 0.03 mol % or less, the NOx concentration at the outlet of the gas turbine 11 can be predicted to be about 80 ppm or less based on the graph shown in FIG. 5. Therefore, in the gas turbine plant of in the present embodiment, when a denitration device is installed inside or outside the exhaust heat recovery boiler 20, the NOx concentration at the outlet of the stack 29 can be reduced to a lower desired concentration, and it becomes possible to comply with nitrogen oxide concentration regulations in many regions around the world.

When the ammonia absorption process (S6) is completed, the above ammonia separation process (S10) in which ammonia is separated from the ammonia water generated in the ammonia absorption process (S6) is executed.

In the ammonia separation process (S10), first, ammonia water at about 30° C. accumulated in the lower part of the absorption tower container 64v flows into the ammonia water heater 74. In the ammonia water heater 74, ammonia water at about 30° C. is heated to about 190° C. by heat exchange with water at about 210° C. (S11: ammonia water heating process).

Ammonia water heated to about 190° C. flows into the separation tower 75. The separation tower 75 is a device that is provided for separating and distilling ammonia from ammonia water using water vapor. Therefore, in order to lower the water saturation temperature, the operation pressure in the separation tower container 75v is set to about 2 MPa. As described above, the operation pressure in the absorption tower container 64v is about 5.2 MPa. Using a pressure difference between the pressure in the absorption tower container 64v and the pressure in the separation tower container 75v as a driving force, ammonia water in the absorption tower container 64v flows into the separation tower container 75v via the ammonia water line 73. In the separation tower container 75v, additionally, water vapor at about 250° C. flows into the lower part of the separation tower container 75v. As described above, since the mass flow rate of water sprayed into the absorption tower 64 is the same as the mass flow rate of the decomposition gas DG flowing into the absorption tower 64, the mass flow rate of ammonia water flowing into the separation tower 75 is also the same as the mass flow rate of the decomposition gas DG flowing into the absorption tower 64. The mass flow rate of water vapor required for distilling and separating ammonia from ammonia water with this mass flow rate is about 40% of the mass flow rate of ammonia water.

As described above, ammonia water is heated with water vapor in the separation tower container 75v, ammonia in ammonia water transitions from a liquid phase to a gas phase, and rises in the separation tower container 75v (S12: ammonia separation execution process). On the other hand, water vapor transitions to liquid-phase water and accumulates in the lower part of the separation tower container 75v. The temperature of this water is about 210° C. In addition, the ammonia concentration in this water is 0.05 mol %. Some of this water flows into the water heater 77 via the water circulation line 76. In the water heater 77, this water exchanges heat with the medium pressure steam IS at about 300° C. from the medium pressure steam generation system 23. The medium pressure steam IS, which is the second heating medium M2, is cooled by heat exchange and condensed to become hot water. This hot water flows into the medium pressure pump 24 via the second heating medium recovery line 88. This hot water is pressurized by the medium pressure pump 24 together with hot water from the economizer 22a of the low pressure steam generation system 22, and then flows into the economizer of the medium pressure steam generation system 23. On the other hand, water flowing into the water heater 77 is heated to about 250° C. by heat exchange with the low pressure steam LS, which is the second heating medium M2, and becomes water vapor (S13: water heating process). This water vapor is sent to the separation tower 75 via the water circulation line 76.

The other part of water at about 210° C. accumulated in the lower part of the separation tower container 75v flows into the ammonia water heater 74 via the water line 65. In the ammonia water heater 74, as described above, heat is exchanged between water at about 210° C. and ammonia water at about 30° C. flowing through the ammonia water line 73. According to this heat exchange, water is cooled to about 50° C., but ammonia water is heated to 190° C., as described above. Thus, the ammonia decomposition process (S10) is completed. Here, water at about 50° C. cooled by the ammonia water heater 74 is pressurized by the water supply pump 66 and then flows into the water cooler 67, and cooled by the water cooler 67 and reaches about 30° C. As described above, water at 30° C. is sprayed into the absorption tower 64.

A gas containing gas-phase ammonia in the separation tower container 75v flows into the condenser 78 via the ammonia recovery line 83 connected to the top of the separation tower container 75v. In the condenser 78, this gas is cooled, and water and ammonia contained in this gas are condensed into high-concentration ammonia water. This high-concentration ammonia water returns to a space above the tray 75p in the separation tower container 75v via the water recovery line 79. This high-concentration ammonia water flows down each stage of the tray 75p, and comes into gas-liquid contact with water vapor supplied from the lower stage, and ammonia evaporates preferentially. As a result, the ammonia concentration in the water gradually decreases, and when it passes through the bottom tray, it becomes hot water with an ammonia concentration of 0.05 mol % or less. On the other hand, a gas from which water and the like have been removed by the condenser 78, that is, a gas having a high gas-phase ammonia concentration, is pressurized by the ammonia compressor 84 provided at the ammonia recovery line 83, and then flows into the ammonia decomposer 53 via the ammonia supply line 81 (S14: ammonia recovery process). As described above, in the present embodiment, since the residual ammonia removed by the ammonia removal device 61 returns to the ammonia supply line 81, the amount of waste in ammonia as a raw material can be minimized.

With this, a series of ammonia decomposition processes performed by the ammonia decomposition facility 50 is completed.

Next, performance prediction results of the gas turbine plant of the present embodiment will be described with reference to Table 1. Here, this table compares predicted performance values in the gas turbine plant of the present embodiment and performance values in a general natural gas-fired gas turbine combined cycle plant.

TABLE 1

| Classification | Item | Unit | Natural gas-fired gas turbine combined cycle plant | Plant of present embodiment |
| --- | --- | --- | --- | --- |
| Plant inlet fuel | Composition | mol % | CH4 = 90%, C2H6 = 5%, C3H8 = 2%, N2 = 1%, CO2 = 2% | NH3 = 100% |
| | Heating value (LHV standard) | kJ/mol | 835 | 317 |
| | Heating value × flow rate | Relative value | 100 | 95.2 |

TABLE 1-continued

| Classification | Item | Unit | Natural gas-fired gas turbine combined cycle plant | Plant of present embodiment |
|---|---|---|---|---|
| Combustor inlet fuel | Composition | mol % | CH4 = 90%, C2H6 = 5%, C3H8 = 2%, N2 = 1%, CO2 = 2% | H2 = 75%, N2 = 25% |
| | Heating value (LHV standard) | kJ/mol | 835 | 181 |
| | Heating value × flow rate | Relative value | 100 | 109.2 |
| Operation state of gas turbine | Exhaust gas flow rate | Relative value | 100 | 103.7 |
| | Pressure ratio | Relative value | 100 | 106.3 |
| | Exhaust gas temperature | Relative value | Base | −14° C. |
| Output | GT output | Relative value | 100 | 117 |
| | ST output | Relative value | 100 | 39 |
| | GTCC output (power generation end) | Relative value | 100 | 93.2 |
| Plant efficiency | Power generation end efficiency (LHV standard) | Relative value | 100 | 97.4 |
| | Power transmission end efficiency (LHV standard) | Relative value | 100 | 97.4 |

In the present embodiment, the fuel supplied to the combustor 11b contains about 75% of hydrogen and about 25% of nitrogen. The heating value of the fuel is about 181 kJ/mol, which is about ⅕ of about 835 kJ/mol that is the heating value of general natural gas. As a result, in the general natural gas-fired gas turbine, the molar ratio of the fuel flow rate to the intake air flow rate of the compressor is 5% or less. On the other hand, in the present embodiment, the molar ratio of the fuel flow rate to the intake air flow rate of the compressor is 20% or more. In order to generate a combustion gas at a desired temperature in the combustor 11b, it is necessary to supply a fuel having a heat amount that is substantially proportional to the total value of the molar flow rate of the compressed air and fuel supplied to the combustor 11b. Therefore, the heat amount of the fuel required at the inlet of the combustor 11b of the present embodiment is 109.2% as compared with the case of natural gas firing. However, as described above, since the heating value of the decomposition gas DG after the reaction increases by a factor of 1.14 due to the ammonia decomposition reaction, the heat amount of ammonia input at the inlet of the plant may be 95.2% as compared with the case of natural gas firing.

As described above, in the present embodiment, since the volume flow rate of the fuel input to the combustor 11b significantly increases as compared with the case of natural gas firing, the exhaust gas flow rate of the turbine 11c is 103.7% of the exhaust gas flow rate in the case of natural gas firing. Therefore, in the present embodiment, the pressure loss in the gas path of the turbine 11c is larger than in the case of natural gas firing. As a result, the pressure ratio of the turbine 11c in the present embodiment is 106.3% of the pressure ratio in the case of natural gas firing. When the pressure ratio of the turbine 11c becomes higher, the heat drop of the fluid expanding in the turbine 11c also becomes large, and the exhaust gas temperature of the turbine 11c is 14° C. lower than the exhaust gas temperature of the turbine 11c in the case of natural gas firing. That is, in the present embodiment, as compared with the case of natural gas firing, the volume flow rate of the working fluid of the turbine 11c is increased by 3.7%, the pressure ratio of the gas turbine 11 is increased by 6.3%, and the exhaust gas temperature of the turbine 11c is lowered by 14° C. Therefore, in the present embodiment, due to the above synergistic effect, the gas turbine output is 117% of the gas turbine output in the case of natural gas firing.

Incidentally, in the present embodiment, overheated steam generated in the first high pressure steam generation system 26 and some of overheated water vapor generated in the medium pressure steam generation system 23 are consumed in the ammonia decomposition facility 50. Therefore, the output of the steam turbines 31, 32, and 33 in the present embodiment is 39% of the steam turbine output in the case of natural gas firing. Therefore, the output of the gas turbine combined cycle plant in the present embodiment is about 93.2% of the gas turbine combined cycle plan in the case of natural gas firing.

As described above, since the heat amount of ammonia input at the inlet of the plant is 95.2% in the case of natural gas firing, the gross thermal efficiency of the entire plant in the present embodiment is about 97.4% (relative value) of the gross thermal efficiency of the entire plant in the case of natural gas firing. The gross thermal efficiency of the gas turbine combined cycle plant in the case of natural gas firing at 1,650° C. grade is 63% (LHV standard) or more. On the other hand, the gross thermal efficiency of the plant in the present embodiment is 60% (LHV standard) or more. In this manner, when ammonia, which is one of energy carriers of hydrogen, is used, it is possible to provide a plant with high efficiency and a significantly reduced amount of carbon dioxide emissions.

As described above, the ammonia decomposition facility 50 of the present embodiment includes the ammonia removal device 61 that removes the residual ammonia from the decomposition gas DG containing hydrogen, nitrogen, and the residual ammonia generated by the ammonia decomposition device 51 in addition to the ammonia decomposition device 51 that thermally decomposes ammonia. Therefore, in the present embodiment, it is possible to reduce the concentration of the residual ammonia contained in the gas sent to the gas utilization target. Therefore, in the present embodiment, it is possible to reduce the NOx concentration in the exhaust gas EG generated by combustion of the fuel by the combustor 11b, which is the gas utilization target. In addition, in the present embodiment, since a decomposition gas containing no carbon is used as a fuel by the combustor 11b, which is the gas utilization target, it is possible to reduce the amount of $CO_2$ in the exhaust gas EG generated by combustion of the fuel.

In addition, in the present embodiment, since heat generated by driving the gas turbine 11 is used for thermal decomposition of ammonia, energy costs for operating the ammonia decomposition facility 50 can be reduced more than when a dedicated device for generating heat for thermal decomposition of ammonia is separately provided.

As described above, in the ammonia decomposition reaction, ammonia thermal decomposition can be promoted in a low pressure environment. Therefore, when ammonia is thermally decomposed in a low pressure environment, the concentration of the residual ammonia can be made the same (0.03 mol %) as in the present embodiment without providing the ammonia removal device 61. In order to make the concentration of the residual ammonia the same (0.03 mol %) as in the present embodiment without providing the ammonia removal device 61, as can be understood from the graph shown in FIG. 4, for example, it is necessary to set the pressure in an ammonia decomposition environment to 0.1 MPa, and the temperature in the ammonia decomposition environment to 650° C. Therefore, when it is desired to set the concentration of the residual ammonia to be the same as in the present embodiment without providing the ammonia removal device 61, it is necessary to set the temperature in the ammonia decomposition environment to be higher than in the present embodiment and in order to guide a gas after decomposing ammonia to the gas utilization target, it is necessary to pressurize this gas with a booster. The ammonia decomposition reaction is a reaction in which the number of moles after the reaction is twice the number of moles before the reaction. Since the cross-sectional area of the flow path of the booster that pressurizes a fuel gas is substantially proportional to the volume flow rate of the gas, in order to pressurize the decomposition gas after decomposition, it is necessary to provide a large booster (compressor) having a cross-sectional area of the flow path that is about twice that of the case of pressurizing before decomposition. In addition, since the power of the booster for pressurizing the fuel gas obtained by decomposing ammonia gas is substantially proportional to the volume flow rate of the gas, it is about twice the power when ammonia gas before decomposition is pressurized. That is, this method increases facility costs and running costs. On the other hand, in the present embodiment, since ammonia before it is supplied to the ammonia decomposition device 51 is pressurized to a pressure higher than the pressure in the gas utilization target, which is the combustor 11b, by the ammonia booster 80 which is a pump, it can be guided into the gas utilization target even if the gas after decomposing ammonia is not pressurized. Therefore, in the present embodiment, it is possible to reduce facility costs and running costs.

In the present embodiment, hydrogen or natural gas is assumed as the start-up fuel SF. However, as the start-up fuel SF, for example, a liquid fuel such as light oil may be used. In this case, the processed gas PG, which is a gas fuel, and a liquid fuel cannot be sent to the combustor 11b via a common pipe. Therefore, in this case, it is necessary to separately provide a pipe for supplying a liquid fuel to the combustor 11b.

Second Embodiment

A gas turbine plant according to a second embodiment will be described with reference to FIG. 6.

In the gas turbine plant according to the first embodiment, when the gas turbine 11 starts, the start-up fuel SF such as natural gas is used, and only the processed gas PG is used during a steady operation after startup. On the other hand, in the gas turbine plant in the present embodiment, the natural gas NG is used not only during startup but also during a steady operation. However, in the gas turbine plant of in the present embodiment, the processed gas PG is mixed with the natural gas NG during the steady operation, and this mixed gas is used as a fuel.

Figure 6:
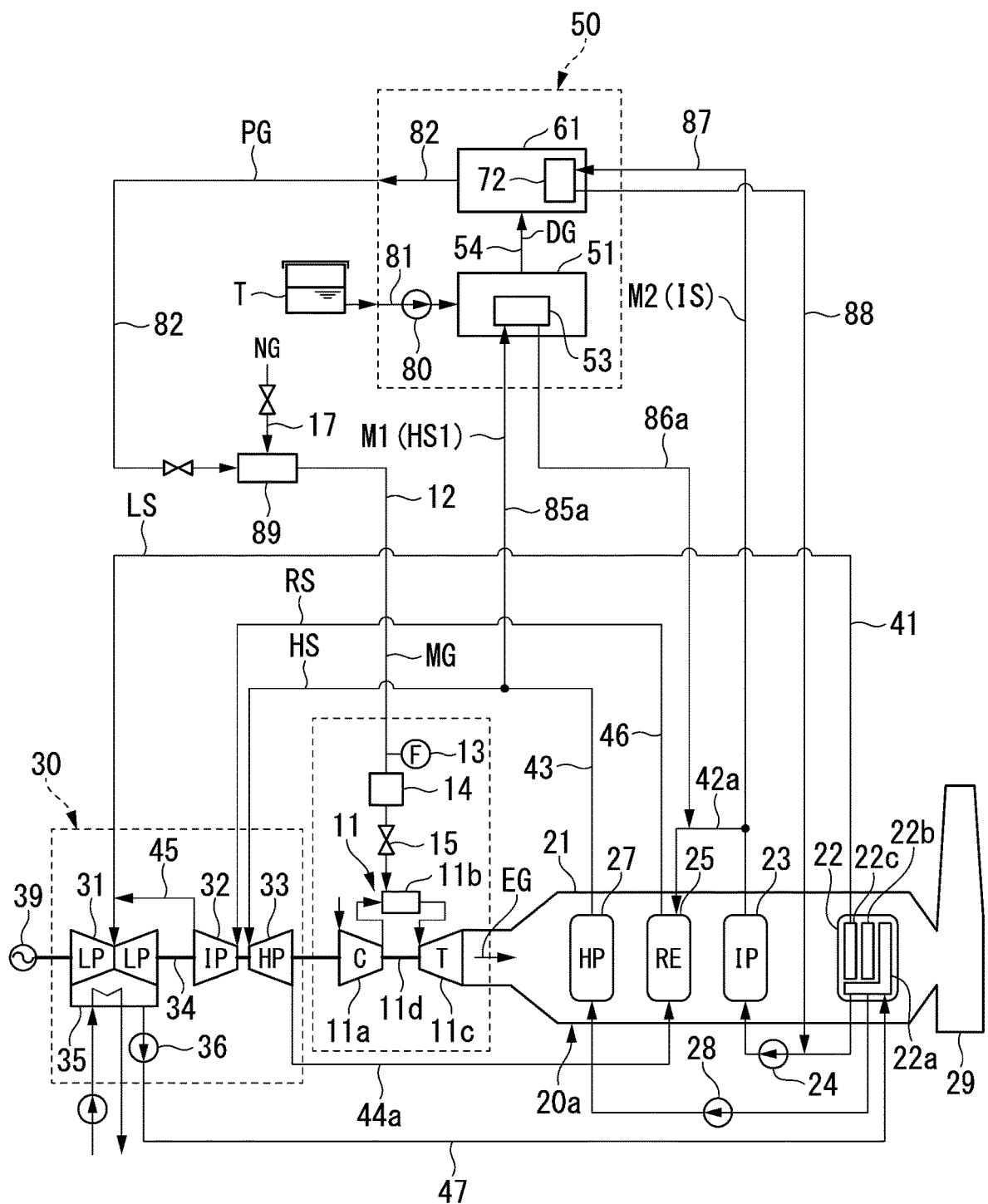
FIG. 6 is a system diagram of a gas turbine plant according to a second embodiment of the present invention.

As in the gas turbine plant in the first embodiment, as shown in FIG. 6, the gas turbine plant in the present embodiment also includes the gas turbine facility 10, the exhaust heat recovery boiler 20, the steam turbine facility 30, and the ammonia decomposition facility 50.

The configuration of the gas turbine facility 10 in the present embodiment is basically the same as the configuration of the gas turbine facility 10 in the first embodiment. The configuration of the steam turbine facility 30 in the present embodiment is basically the same as the configuration of the steam turbine facility 30 in the first embodiment.

The configuration of the ammonia decomposition facility 50 in the present embodiment is slightly different from the configuration of the ammonia decomposition facility 50 in the first embodiment. As in the ammonia decomposition facility 50 in the first embodiment, the ammonia decomposition facility 50 in the present embodiment includes the ammonia supply line 81, the ammonia booster 80, the ammonia decomposition device 51, the ammonia removal device 61, and the processed gas supply line 82. The ammonia decomposition facility 50 in the present embodiment further includes a mixer 89 that mixes the processed gas PG which flows through the processed gas supply line 82 with a main fuel, which is natural gas NG. The processed gas supply line 82 and a main fuel line 17 through which a main fuel, which is natural gas NG, flows are connected to the mixer 89. In addition, one end of the fuel line 12 through which a mixed gas fuel MG in which a processed gas PG and natural gas NG are mixed is connected to the mixer 89. As in the first embodiment, the other end of the fuel line 12 is connected to the combustor 11b. That is, the configuration of the ammonia decomposition facility 50 of the present embodiment is basically the same as the configuration of the ammonia decomposition facility 50 in the first embodiment except that the mixer 89 is added to the ammonia decomposition facility 50 in the first embodiment.

In the present embodiment, the hydrogen concentration in the mixed gas fuel MG is assumed to be about 20 mol %. Since the heating value per unit mole of hydrogen is smaller than that of the natural gas NG, when the hydrogen concentration in the mixed gas fuel MG is about 20 mol %, the ratio of the heating value of hydrogen to the heating value of the mixed gas fuel MG is about 7%. Most of hydrogen contained in the mixed gas fuel MG is hydrogen contained in the processed gas PG. The combustor 11b of the present embodiment has a stable and combustible structure even with a gas fuel containing about 20 mol % of hydrogen.

In the present embodiment, even during a steady operation, the natural gas NG is used as some of the fuel. Therefore, in the present embodiment, during a steady operation, the consumed amount of hydrogen derived from ammonia decomposition is smaller than that in the first embodiment. As a result, in the present embodiment, during a steady operation, the amount of liquid ammonia consumed is smaller than that in the first embodiment.

As described above, the configuration of the ammonia decomposition facility 50 of the present embodiment is basically the same as the configuration of the ammonia decomposition facility 50 in the first embodiment except that the mixer 89 is added to the ammonia decomposition facility 50 in the first embodiment. Therefore, the operation of the ammonia decomposition facility 50 in the present embodiment is basically the same as the operation of the ammonia decomposition facility 50 in the first embodiment described with reference to the flowchart in FIG. 3. However, in the present embodiment, during a steady operation, since the amount of liquid ammonia consumed is smaller than that in the first embodiment, the capacity and processing capacity of each device constituting the ammonia decomposition facility 50 is smaller than the capacity and processing capacity of each device constituting the ammonia decomposition facility 50 in the first embodiment. Specifically, for example, the capacities of the ammonia tank T, the ammonia decomposer 53, the ammonia separator 72 and the like all are smaller than those in the first embodiment.

Therefore, in the present embodiment, the amount of water vapor required for the ammonia decomposer 53 of the ammonia decomposition device 51 and the ammonia separator 72 of the ammonia removal device 61 is smaller than that in the first embodiment. Therefore, in the present embodiment, the configuration of an exhaust heat recovery boiler 20a that generates water vapor is different from the configuration of the exhaust heat recovery boiler 20 in the first embodiment. In addition, in the present embodiment, a line configuration in which water vapor flows is different from a line configuration in which water vapor flows in the first embodiment.

As in the first embodiment, the exhaust heat recovery boiler 20a of the present embodiment includes the low pressure steam generation system 22, the medium pressure steam generation system 23, and the high pressure steam generation system 27. In addition, the exhaust heat recovery boiler 20a of the present embodiment includes a reheat steam system 25. On the other hand, the exhaust heat recovery boiler 20a of the present embodiment does not include a dedicated high pressure steam generation system that generates steam to be sent to the ammonia decomposer 53 of the ammonia decomposition device 51, that is, the first high pressure steam generation system 26 in the first embodiment.

As in the first embodiment, the low pressure steam generation system 22 in the present embodiment includes the economizer 22a, the evaporator 22b, and the superheater 22c. In addition, as in the first embodiment, the medium pressure steam generation system 23 and the high pressure steam generation system 27 in the present embodiment also include an economizer, an evaporator, and a superheater. The reheat steam system 25 in the present embodiment includes only a reheater that overheats steam with the exhaust gas EG.

As in the first embodiment, the superheater of the high pressure steam generation system 27 and the steam inlet of the high pressure steam turbine 33 are connected by the high pressure steam line 43. The steam outlet of the high pressure steam turbine 33 and the steam inlet of the reheater of the reheat steam system 25 are connected by a high pressure exhaust steam line 44a. The superheater of the medium pressure steam generation system 23 and the steam inlet of the reheater of the reheat steam system 25 are connected by a medium pressure steam line 42a. The steam outlet of the reheater of the reheat steam system 25 and the steam inlet of the medium pressure steam turbine 32 are connected by a reheat steam line 46. As in the first embodiment, the superheater 22c of the low pressure steam generation system 22 and the steam inlet of the low pressure steam turbine 31 are connected by the low pressure steam line 41. As in the first embodiment, additionally, the steam inlet of the low pressure steam turbine 31 is connected to the steam outlet of the medium pressure steam turbine 32 by the medium pressure exhaust steam line 45. As in the first embodiment, the steam condenser 35 described above is connected to the steam outlet of the low pressure steam turbine 31. The steam condenser 35 and the economizer 22a of the low pressure steam generation system 22 are connected by the water supply line 47. The condensate pump 36 is provided at the water supply line 47.

As described above, the configuration of the exhaust heat recovery boiler 20a of the present embodiment and the configuration of the line connected to the exhaust heat recovery boiler 20a are basically the same as the configuration of the typical natural gas-fired gas turbine combined cycle plant.

One end of a first heating medium line 85a through which steam as the first heating medium M1 is guided to the ammonia decomposer 53 of the ammonia decomposition device 51 is connected to the high pressure steam line 43. The other end of the first heating medium line 85a is connected to the ammonia decomposer 53 of the ammonia decomposition device 51. That is, the ammonia decomposer 53 of the present embodiment uses some of the high pressure steam HS generated in the high pressure steam generation system 27 as the first heating medium M1 for ammonia thermal decomposition. Here, the rest of the high pressure steam HS generated in the high pressure steam generation system 27 is sent to the high pressure steam turbine 33. A first heating medium recovery line 86a connects the ammonia decomposer 53 to the medium pressure steam line 42a. The first heating medium recovery line 86 guides the high pressure steam HS after it is used in the ammonia decomposer 53 into the medium pressure steam line 42a.

As in the first embodiment, one end of the second heating medium line 87 through which steam as the second heating medium M2 is guided to the ammonia separator 72 of the ammonia removal device 61 is connected to the medium pressure steam line 42a. The other end of the second heating medium line 87 is connected to the ammonia separator 72. That is, the ammonia decomposer 53 of the present embodiment uses some of the medium pressure steam IS generated in the medium pressure steam generation system 23 as the second heating medium M2 for heating water. Here, the rest of the medium pressure steam IS generated in the medium pressure steam generation system 23 is sent to the reheat steam system 25. As in the first embodiment, the second heating medium recovery line 88 connects the ammonia separator 72 to the suction port at the medium pressure pump 24 of the exhaust heat recovery boiler 20a. In the ammonia separator 72, the second heating medium recovery line 88 guides hot water generated by condensation of the medium pressure steam IS of which heat is exchanged with water to the medium pressure pump 24.

As described above, the ammonia decomposition facility 50 of the present embodiment also includes the ammonia removal device 61 that removes the residual ammonia from the decomposition gas DG containing hydrogen, nitrogen, and the residual ammonia generated by the ammonia decomposition device 51 in addition to the ammonia decomposition device 51 that thermally decomposes ammonia. Therefore, also in the present embodiment, it is possible to reduce the concentration of the residual ammonia contained in the gas sent to the gas utilization target. Therefore, in the present embodiment, it is possible to reduce the NOx concentration in the exhaust gas EG generated by combustion of the fuel by the combustor 11b, which is the gas utilization target. In addition, in the present embodiment, since the mixed gas fuel MG in which a fuel containing no carbon and natural gas NG are mixed is combusted in the combustor 11b, which is the gas utilization target, it is possible to reduce the amount of $CO_2$ in the exhaust gas EG generated by combustion of the mixed gas fuel MG.

In addition, also in the present embodiment, as in the first embodiment, since ammonia before it is supplied to the ammonia decomposition device 51 is pressurized to a pressure higher than the pressure in the gas utilization target, which is the combustor 11b, by the ammonia booster 80, it can be guided into the gas utilization target even if the gas after decomposing ammonia is not pressurized. Therefore, also in the present embodiment, it is possible to reduce facility costs and running costs.

In the present embodiment, within the steam generated in the exhaust heat recovery boiler 20a, the amount of steam used in the ammonia decomposition facility 50 is smaller than that in the first embodiment. In other words, in the present embodiment, within the steam generated in the exhaust heat recovery boiler 20a, the amount of steam used in the steam turbine facility 30 is larger than that in the first embodiment. Therefore, in the present embodiment, it is possible to increase the output of the steam turbines 31, 32, and 33 more than in the first embodiment.

Since the exhaust heat recovery boiler 20a of the present embodiment does not include a dedicated high pressure steam generation system that generates steam to be sent to the ammonia decomposer 53 of the ammonia decomposition device 51, even if the ammonia decomposition facility 50 is added to an existing gas turbine combined cycle plant, the modification range of the exhaust heat recovery boiler can be minimized. Therefore, in this case, when the plant configuration in the present embodiment is used, the costs required for plant improvement are reduced more than when the plant configuration in the first embodiment is used.

Modification Example

In the above embodiments, the gas turbine rotor 11d and the steam turbine rotor 34 are connected. However, the gas turbine rotor 11d and the steam turbine rotor 34 may not be connected. In this case, a generator is connected to each of the gas turbine rotor 11d and the steam turbine rotor 34.

The steam turbine facility 30 in each of the above embodiments includes three types of the steam turbines 31, 32, and 33 in which inflow steam pressures are different from each other. However, the steam turbine facility may include only one type of steam turbine as the steam turbine. In this case, the steam generation system of the exhaust heat recovery boiler need only include one type of steam generation system as a steam generation system that generates steam for driving the steam turbine.

In the above embodiments, the heating medium sent to the ammonia decomposer 53 is water vapor from the exhaust heat recovery boilers 20 and 20a. However, any medium may be used as long as heat generated by driving the gas turbine 11 is used. For example, the exhaust gas EG from the gas turbine 11 may be used as a heating medium to be sent to the ammonia decomposer 53. In this case, there is an advantage that heat can be exchanged with an exhaust gas having a higher temperature than water vapor. On the other hand, in this case, since the exhaust gas EG has a smaller heat capacity than water vapor with a high pressure, there is a disadvantage that the required volume flow rate of the exhaust gas EG increases and the size of the device becomes large as a whole.

In the above embodiments, as a method of removing ammonia from the decomposition gas DG, a method of bringing the decomposition gas DG into contact with water is used in the absorption tower 64. However, as a method of removing ammonia from the decomposition gas DG, a pressure swing adsorption (PSA) method may be used. The pressure swing adsorption method is a dry method. However, in this method, it is necessary to pay attention to the pressure fluctuation during switching between absorption and desorption.

In the above embodiments, the water heater 77 may be arranged outside the separation tower 75 in the ammonia separator 72. That is, in the above embodiments, water accumulated in the lower part of the separation tower 75 is drawn to the outside, and this water is heated by the water heater 77. However, the water heater may be arranged inside the separation tower 75 in the ammonia separator 72.

In the above embodiments, in the water heater 77 in the ammonia separator 72, the second heating medium M2 that heats water is a medium heated by heat generated by driving the gas turbine 11, specifically, the medium pressure steam IS. However, in the water heater 77, the second heating medium M2 that heats water may be, for example, the decomposition gas DG.

In the above embodiments, the condenser 78 is arranged outside the separation tower 75 in the ammonia separator 72. That is, in the above embodiments, the gas in the separation tower 75 is drawn to the outside, and some of the gas is condensed by the condenser 78. However, the condenser may be arranged in the upper space in the separation tower 75 in the ammonia separator 72.

In the above embodiments, a filling material method is used as a gas-liquid contact method in the absorption tower 64 in the ammonia absorber 62. In addition, in the above embodiments, a tray method is used as a gas-liquid contact method in the separation tower 75 in the ammonia separator 72. However, since there are other gas-liquid contact methods, other methods may be used as the gas-liquid contact method in the absorption tower 64 and the separation tower 75. A plurality of methods that realize the gas-liquid contact method each have different advantages and disadvantages in device size, device capital costs, device maintenance costs, device pressure loss, required device power, device durability, and the like. Therefore, among a plurality of methods that realize the liquid contact method, an optimal method may be selected according to plant specifications, location conditions, and the like.

The gas utilization target in the above embodiment is the combustor 11b. However, the gas utilization target is not limited to the combustor 11b, and may be, for example, a fuel cell.

INDUSTRIAL APPLICABILITY

According to one aspect of the present invention, it is possible to reduce the residual ammonia in the decomposition gas generated by thermal decomposition of ammonia. In addition, according to one aspect of the present invention, it is possible to reduce energy costs for operating the ammonia decomposition facility.

REFERENCE SIGNS LIST

10 Gas turbine facility
11 Gas turbine
11a Air compressor
11b Combustor
11c Turbine
11d Gas turbine rotor
12 Fuel line
13 Flow meter
14 Preheater
15 Fuel control valve
16 Start-up fuel line
17 Main fuel line
20, 20a Exhaust heat recovery boiler
21 Boiler frame
22 Low pressure steam generation system
22a Economizer
22b Evaporator
22c Superheater
23 Medium pressure steam generation system
24 Medium pressure pump
25 Reheat steam system
26 First high pressure steam generation system
27 Second high pressure steam generation system (high pressure steam generation system)
28 High pressure pump
29 Stack
30 Steam turbine facility
31 Low pressure steam turbine
32 Medium pressure steam turbine
33 High pressure steam turbine
34 Steam turbine rotor
35 Steam condenser
36 Condensate pump
39 Generator
41 Low pressure steam line
42, 42a Medium pressure steam line
43 High pressure steam line
44, 44a High pressure exhaust steam line
45 Medium pressure exhaust steam line
46 Reheat steam line
47 Water supply line
T Ammonia tank
50 Ammonia decomposition facility
51 Ammonia decomposition device
52 Ammonia heater
53 Ammonia decomposer
54 Decomposition gas line
61 Ammonia removal device
62 Ammonia absorber
63 Decomposition gas cooler
64 Absorption tower
64p Filling material
64v Absorption tower container
65 Water line
66 Water supply pump
67 Water cooler
72 Ammonia separator
73 Ammonia water line
74 Ammonia water heater
75 Separation tower
75v Separation tower container
75p Tray
76 Water circulation line
77 Water heater
78 Condenser
79 Water recovery line
80 Ammonia booster
81 Ammonia supply line
82 Processed gas supply line
83 Ammonia recovery line
84 Ammonia compressor
85, 85a First heating medium line (heating medium line)
86, 86a First heating medium recovery line
87 Second heating medium line
88 Second heating medium recovery line
89 Mixer
EG Exhaust gas
LS Low pressure steam
IS Medium pressure steam
RS Reheat steam
HS High pressure steam
HS1 First high pressure steam
HS2 Second high pressure steam
M1 First heating medium
M2 Second heating medium
DG Decomposition gas
SF Start-up fuel
PG Processed gas
MG Mixed gas fuel
NG Natural gas

The invention claimed is:

1. An ammonia decomposition facility, comprising:
a first heating medium line configured to flow a heating medium heated by heat generated by a gas turbine;
a second heating medium line configured to flow a heating medium heated by heat generated by the gas turbine;
an ammonia supply line configured to flow ammonia;
an ammonia decomposition device that is connected to the first heating medium line and the ammonia supply line, and is configured to use heat of the heating medium from the first heating medium line, thermally decompose the ammonia from the ammonia supply line, and generate a decomposition gas containing hydrogen, nitrogen, and residual ammonia;
an ammonia removal device configured to remove the residual ammonia contained in the decomposition gas from the ammonia decomposition device; and
a processed gas supply line configured to guide a processed gas, which is a decomposition gas from which the residual ammonia has been removed by the ammonia removal device, to a gas utilization target,
wherein the ammonia removal device includes an ammonia absorber and an ammonia separator,
wherein the ammonia absorber is configured to bring the decomposition gas from the ammonia decomposition device into contact with water, dissolve the residual ammonia in the decomposition gas in the water and exhaust the processed gas, wherein the ammonia separator includes a separation tower and a water heater, wherein, in the separation tower, ammonia water, which is the water in which the residual ammonia dissolves, is configured to be brought into contact with water vapor, heat the ammonia water, and separate ammonia from the ammonia water, wherein the water heater is configured to heat water in which ammonia has been separated from the ammonia water to form water vapor, and then return the water vapor to the separation tower, and wherein the water heater is a heat exchanger that is configured to exchange heat between water in which ammonia has been separated from the ammonia water and the heating medium from the second heating medium line and form the water into water vapor.

2. The ammonia decomposition facility according to claim 1, further comprising:
an ammonia recovery line that is connected to the ammonia removal device and is configured to guide the residual ammonia removed by the ammonia removal device to the ammonia supply line.

3. The ammonia decomposition facility according to claim 1, further comprising:
an ammonia booster that is provided at the ammonia supply line and is configured to pressurize the ammonia flowing through the ammonia supply line to a pressure higher than a pressure in the gas utilization target.

4. A gas turbine plant, comprising:
the ammonia decomposition facility according to claim 1; and
the gas turbine,
wherein the gas turbine includes an air compressor configured to compress air to generate compressed air, a combustor configured to combust a fuel in the compressed air to generate a combustion gas, and a turbine configured to be driven by the combustion gas, and
wherein the processed gas supply line is configured to guide the processed gas to the combustor using the combustor as the gas utilization target.

5. A gas turbine plant, comprising:
the ammonia decomposition facility according to claim 1;
the gas turbine; and
an exhaust heat recovery boiler configured to generate steam with heat of an exhaust gas exhausted from the gas turbine,
wherein the first heating medium line is connected to the exhaust heat recovery boiler, and is configured to guide steam generated by the exhaust heat recovery boiler as the heating medium to the ammonia decomposition device.

6. The gas turbine plant according to claim 5,
wherein the second heating medium line is connected to the exhaust heat recovery boiler, and is configured to guide steam generated by the exhaust heat recovery boiler as the heating medium to the water heater.

7. An ammonia decomposition method of executing:
an ammonia decomposition process in which ammonia is thermally decomposed in an ammonia decomposition device using heat of a heating medium heated by heat generated in a gas turbine and a decomposition gas containing hydrogen, nitrogen, and residual ammonia is generated;
an ammonia removal process in which the residual ammonia contained in the decomposition gas is removed; and
a processed gas supply process in which a processed gas, which is a decomposition gas from which the residual ammonia has been removed in the ammonia removal process, is guided to a gas utilization target,
wherein the ammonia removal process includes an ammonia absorption process and an ammonia separation process,
wherein, in the ammonia absorption process, the decomposition gas obtained by executing the ammonia decomposition process is brought into contact with water, the residual ammonia in the decomposition gas dissolves in water, and the processed gas is discharged,
wherein the ammonia separation process includes a separation execution process and a water heating process,
wherein, in the separation execution process, ammonia water, which is water in which the residual ammonia dissolves, is brought into contact with water vapor, and ammonia evaporates and is separated from the ammonia water,
wherein, in the water heating process, water in which ammonia has been separated from the ammonia water is heated to form water vapor used in the separation execution process, and
wherein, in the water heating process, heat is exchanged between water in which ammonia has been separated from the ammonia water and a heating medium heated by heat generated by the gas turbine, and the water is heated.

8. The ammonia decomposition method according to claim 7,
wherein an ammonia recovery process in which the residual ammonia removed in the ammonia removal process is merged with ammonia before it is thermally decomposed in the ammonia decomposition process is executed.

9. The ammonia decomposition method according to claim 7,
wherein an ammonia supply process in which ammonia before it is thermally decomposed in the ammonia decomposition process is pressurized to a pressure higher than a pressure in the gas utilization target and the pressurized ammonia is then supplied to the ammonia decomposition device is executed.

10. The ammonia decomposition method according to claim 7,
wherein, in the processed gas supply process, the processed gas is guided to a combustor using the combustor of the gas turbine as the gas utilization target.

11. The ammonia decomposition method according to claim 7,
wherein the concentration of the residual ammonia in the processed gas is set to a concentration at which the concentration of nitrogen oxides in an exhaust gas exhausted from the gas turbine is less than a desired concentration.

* * * * *